United States Patent Office 3,467,748
Patented Sept. 16, 1969

---

3,467,748
COATED GELATIN CAPSULES
Arno Widmann, Eberbach, Baden, Germany, assignor to R. P. Scherer G.m.b.H., Eberbach, Baden, Germany, a firm of Germany
No Drawing. Filed Nov. 22, 1963, Ser. No. 325,756
Claims priority, application Germany, Jan. 5, 1963, Sch 32,557
Int. Cl. A61k 9/02
U.S. Cl. 424—32      4 Claims The present invention relates to gelatin capsules containing medicaments that resemble and conform to the size and configurations of conventional rectal suppositories, which are coated with films of substances that facilitate the administration of the gelatin capsule per anum or per rectum.

The products of the present invention are referred to in the title and herein as coated gelatin capsules or "gelatin rectal capsules" rather than "rectal capsules" or "gelatin suppositories."

The preparation of a suppository that is a pharmaceutically elegant product and that is unaffected by and resistant to tropical climatic conditions, and a reliable and trouble-free process by which such suppositories can be produced in large quantities at high production rates or speeds and to contain accurate dosages of medicaments, are two of the problems in this art which heretofore have not been solved in an entirely satisfactory manner.

Rectal capsules of various sizes and shapes (tapered, torpedo-shaped, drop-like or pendant, rhombohedral, ovoid, or other configurations) prepared with a water-soluble casing or shell of gelatin or composed entirely of a gelatin composition through which a medicament is distributed or dispersed, which have been formed or produced by use of the conventional rotary-die process, are an improvement over heretofore known suppositories and alleviate both of the foregoing problems. Such gelatin capsules are resistant to tropical climates, can be produced in large quantities at high production speeds with a dosage tolerance of or accuracy within ±1%, and can be produced in shapes or configurations that do not vary substantially from capsule to capsule.

However, conventional uncoated gelatin rectal capsules, when administered per anum, adhere or stick to moist or mucous anal tissues and do not pass freely by or through the anal sphincter. Moistening the capsule or applying a lubricating ointment or oil thereto does not in most cases satisfactorily prevent this objectionable adhesion or sticking. To overcome such objectionable adhesion or sticking and facilitate the administration of such gelatin capsules, films or coatings should possess besides the desirable property of preventing such sticking, the following properties:

(1) Ability to withstand tropical climatic conditions, i.e., have a melting or softening point that is not below a temperature of about 113° F. (45° C.) and is resistant to sticking to and bleeding or diffusion into packaging materials.

(2) Ability of capsules coated with such films, when packed closely together, to resist sticking to each other and to the container.

(3) The coating must be composed of and contain only physiologically or pharmaceutically acceptable and not objectionable substances.

(4) The coating must be easily applicable to the capsule at high production speeds and no secondary or aftertreatment of the coated capsules should be necessary or required.

The compositions and processes described herein provide films or coatings which, when applied to such gelatin rectal capsules, provide coated rectal gelatin capsules that are pharmaceutically elegant and meet the foregoing requirements.

Coatings or film-forming compositions which are suitable for application to gelatin rectal capsules to provide the improved coated products of this invention contain lubricating substances or mixtures of substances which on contact with mucous anal tissue are capable of forming an emulsion. Partial esters of glycerol with saturated and unsaturated aliphatic monocarboxylic acids containing from 8 to 20 carbon atoms and not more than one double bond, such as glycerol monooleate, and polyethylene glycols of high molecular weight, are useful for this purpose. Such coatings also contain minor proportions of a polyvinyl acetate which primarily serves to increase the adhesiveness of the coating to the gelatin body of the rectal capsule. Coating compositions that are particularly suited for this purpose are illustrated in the examples which follow.

The coating or film that is deposited or formed on the gelatin capsule in accordance with this invention readily forms an emulsion when it is subsequently moistened with water or comes into contact with mucous anal tissues as the coated capsule passes the anal sphincter. Upon contact with such moisture, the coated gelatin capsule becomes slippery or capable of sliding smoothly so that it may be inserted or administered without any difficulty. The objectionable adhesion, irritation, or smarting previously observed with uncoated capsules has thereby been completely eliminated.

The film or coating may be applied to preformed gelatin rectal capsules in the form of a solution in a solvent in which gelatin is substantially insoluble. Solvents which may be employed for this purpose are trichloroethylene, methylene chloride (dichloromethane), tetrachloroethylene, acetone, or other suitable solvent or mixture of solvents. This solution may be applied to the preformed capsules in a rotating or revolving tablet-coating drum or suitable container by tumbling or shaking the same or by other suitable means. The solvent or solvent mixture is removed from the wet coated capsules by subjecting them to aspiration with a stream of air that is subsequently forced through the mass. The solution may be applied to the capsules in one or more portions and may be applied by spraying the capsules therewith.

Alternatively, the components of the film-forming coating composition may be emulsified or suspended in a solvent or mixture of solvents and applied to the rectal capsules by suitable means such as by means of a spray gun or similar devices. The components of the film-forming coating composition may also be melted together without a solvent or together with a minor proportion of a solvent and applied hot in the form of a spray to preformed gelatin rectal capsules in a rotating coating pan or by other suitable means. Advantageously the air that is employed to aspirate the wet coated capsules and expel the solvent therefrom should have a relative humidity of about 25% and a temperature between about 20 and 40° C., dependent upon the rate of aspiration and other prevailing conditions.

Medicaments or medicinal substances which may be contained in the core of the gelatin capsules or distributed throughout the gelatin in accordance with this invention are those which are normally used or prescribed. Typical coatings and methods by which they may be applied to such gelatin capsules are illustrated in the examples which follow.

Coated gelatin rectal capsules when produced in accordance with this invention have a dull nonlustrous appearance. They are resistant to tropical climatic conditions and are not sticky even at abnormally high atmospheric temperatures and are eminently free from other objections to which uncoated gelatin rectal capsules are normally subject.

Example 1

A composition for coating gelatin rectal capsules is prepared by dissolving in a suitable quantity of trichloroethylene, methylene chloride, tetrachloroethylene, acetone, or other suitable solvent or mixture of solvents, with the aid of heat if necessary, the following ingredients in the following quantities:

7.0 grams of a commercial polyethylene glycol having an average molecular weight of about 20,000,
3.0 grams of a commercial grade of glycerol monooleate (containing approximately equal parts by weight of glycerol monooleate and glycerol dioleate), and 0.2 gram of polyvinyl acetate.

This solution may be applied to gelatin capsules as described hereinbefore. It produces an exceptionally desirable coating.

Example 2

A composition for coating gelatin rectal capsules is prepared by using any of the solvents or mixture of solvents specified herein and heat if necessary from the following ingredients in the following quantities:

10.0 grams of commercial glycerol monooleate (containing approximately equal parts by weight of glycerol monooleate and glycerol dioleate), and
0.2 gram of polyvinyl acetate.

This formulation also provides a coating which performs satisfactorily in the manner and for the purpose described herein and may, for reasons of inexpensiveness and availability of raw materials, be produced in preference to that described in Example 1.

Example 3

A composition for coating gelatin rectal capsules is prepared by using any of the solvents or mixture of solvents specified herein and heat if necessary from the following quantities of the following substances:

10.0 grams of polyethylene glycol having an average molecular weight of 20,000, and
0.2 gram of polyvinyl acetate.

Preformed gelatin rectal capsules are coated with this solution in the manner described hereinbefore.

Although the above examples represent preferred embodiments of coated capsules and compositions for coating gelatin rectal capsules, they may be further varied in conventional manner in accordance with the description that follows.

The polyvinyl acetate which is used as a film-forming coating ingredient may be any polyvinyl acetate but preferably is a polyvinyl acetate having a degree of polymerization between 5 and 60 or more units of vinyl acetate per molecule. Polymers having a low molecular weight, even those which are used for the production of chewing gum, are suitable for use in the coating composition for the production of the coated capsules of the present invention. The preferred polyvinyl acetates are completely soluble in each of acetone and lower ketones, lower aliphatic alcohols and esters, ethylene glycol, benzene and trichloroethylene.

The lubricating substances, such as polyethylene glycol and glycerol monooleate (containing glycerol dioleate), which are capable of forming an emulsion on contact with mucous anal tissue, may be replaced by related substances. For example, the glycerol monooleate (containing glycerol dioleate) may be replaced by glycerol dioleate, glycerol monooleate, glycerol monostearate, glycerol distearate, glycerol monopalmitate, glycerol dipalmitate, or similar partial esters of glycerol with saturated and unsaturated fatty acids containing from 10 to 20 carbon atoms. The polyethylene glycol may contain polyethylene glycols having lower molecular weights than that specified in the Examples 1 and 3, namely, between 1000 and 6000.

I claim:

1. A gelatin capsule suitable for administration rectally and containing a medicament, the surface of which is coated with an essentially dry adherent continuous film whose softening point is above a temperature of at least 45° C., said film consisting essentially of a lubricating substance selected from the group consisting of polyethylene glycol having an average molecular weight of about 20,000, a partial ester of glycerol with an acid of the group consisting of saturated and unsaturated aliphatic monocarboxylic acids containing from 8 to 20 carbon atoms and not more than one double bond and mixtures thereof and about 0.2 percent of polyvinyl acetate, said lubricating substance being present in such amounts that upon contact with moisture the coated capsule becomes slippery and non-adherent to mucous anal tissue.

2. A gelatin capsule as defined in claim 1 having a size and shape suitable for administration rectally.

3. A gelatin capsule as defined in claim 1 in which the coating film consists essentially of a partial ester of glycerol with an acid of the group consisting of saturated and unsaturated aliphatic monocarboxylic acids containing from 8 to 20 carbon atoms and not more than one double bond, and about 0.2 percent of polyvinyl acetate.

4. A gelatin capsule as defined in claim 1 in which the coating film consists essentially of about 7 parts by weight of polyethylene glycol having an average molecular weight of 20,000, 3.0 parts by weight of glycerol monooleate containing glycerol dioleate, and 0.2 part by weight of a polyvinyl acetate having adegree of polymerization between 5 and 60 units of polyvinyl acetate per molecule.

References Cited

UNITED STATES PATENTS

| 2,477,292 | 7/1949 | Fessenden | 167—64 |
| 2,702,264 | 2/1955 | Klaui | 167—82 |
| 2,805,977 | 9/1957 | Robinson et al. | 167—82 |
| 3,197,369 | 7/1965 | Wicmann et al. | 167—64 |

ALBERT T. MEYERS, Primary Examiner

D. R. MAHANAND, Assistant Examiner

U.S. Cl. X.R.

424—37, 78